United States Patent
Cté

(10) Patent No.: US 9,189,888 B1
(45) Date of Patent: Nov. 17, 2015

(54) POINT CLOUD MODELING BASED ON USER-PROVIDED SEED

(71) Applicant: Bentley Systems, Incorporated, Exton, PA (US)

(72) Inventor: Stéphane Cté, Lac Beauport (CA)

(73) Assignee: BENTLEY SYSTEMS, INCORPORATED, Exton, PA (US)

( * ) Notice: Subject to any disclaimer, the term of this patent is extended or adjusted under 35 U.S.C. 154(b) by 357 days.

(21) Appl. No.: 13/740,761

(22) Filed: Jan. 14, 2013

(51) Int. Cl.
*G06T 17/00* (2006.01)

(52) U.S. Cl.
CPC ..................... *G06T 17/00* (2013.01)

(58) Field of Classification Search
None
See application file for complete search history.

(56) References Cited

U.S. PATENT DOCUMENTS

| | | | |
|---|---|---|---|
| 8,423,896 B2* | 4/2013 | Davis et al. | 715/764 |
| 2003/0197715 A1* | 10/2003 | Hosokawa et al. | 345/619 |
| 2005/0099637 A1* | 5/2005 | Kacyra et al. | 356/601 |
| 2006/0064640 A1* | 3/2006 | Forlines et al. | 715/702 |
| 2006/0193179 A1* | 8/2006 | England et al. | 365/185.22 |
| 2010/0328308 A1 | 12/2010 | Gamliel et al. | |
| 2012/0013710 A1 | 1/2012 | Ehrlich et al. | |
| 2012/0250978 A1* | 10/2012 | Taylor | 382/154 |

OTHER PUBLICATIONS

Holzer, Stefan, et al., "Pointcloudlibrary," PLC: Segmentation, ICCV 2011, Barcelona, Spain, Nov. 6, 2011, pp. 1-30.
U.S. Appl. No. 13/287,795, filed Nov. 2, 2011 by Stéphane Côté et al. for a Technique for Enhanced Perception of 3-D Structure in Point Clouds, pp. 1-29.
U.S. Appl. No. 13/618,842, filed Sep. 14, 2012 by Stéphane Côté et al. for Two-Dimensionally Controlled Intuitive Tool for Point Cloud Exploration and Modeling, pp. 1-35.

* cited by examiner

*Primary Examiner* — Kee M Tung
*Assistant Examiner* — Frank Chen
(74) *Attorney, Agent, or Firm* — Cesari and McKenna, LLP; James A. Blanchette (57) ABSTRACT

In one embodiment, a semi-automated technique is used to reconstruct a vector-based model from a point cloud that represents a physical subject. At least a portion of the point cloud is displayed. A selection of a seed of points that correspond to a particular physical feature of the physical subject is received from a user. The selection is received with a flashlight virtual tool having a field of view. An automatic detection of a geometric primitive is performed based on the seed of points. The automatic detection uses an iterative algorithm that detects an initial geometric primitive based on the seed of points, uses the initial geometric primitive to determine an expanded set of points, and detects a refined geometric primitive based on the expanded set of points. A vector-based model is produced using the detected geometric primitive.

22 Claims, 11 Drawing Sheets

POINT CLOUD MODELING BASED ON USER-PROVIDED SEED

BACKGROUND

1. Technical Field

The present disclosure relates to point clouds, and more specifically, to techniques for reconstructing a vector-based model from point clouds.

2. Background Information

Three-dimensional (3-D) laser scanners are increasingly being used to accurately and quickly capture the shape of physical subjects, such as discrete objects, portions of structures, terrain, or other parts of the physical environment. Such scanners capture a point cloud of geometric samples on the surface of the subject. To accomplish such task, a 3-D laser scanner typically emits some form of coherent light and detects its reflection from the surface of the physical subject. Some 3-D laser scanners rely on time-of-flight. In a time-of-flight 3-D laser scanner, a laser emits pulses of coherent light in a grid-like pattern to scan the physical subject. A laser rangefinder finds the distance to the surface of the physical subject for each pulse of coherent light by timing the round-trip-time of the pulse of light, from its emission, to its reflection back to the laser rangefinder. Other 3-D laser scanners rely on some form of triangulation. Like a time-of-flight 3-D laser scanner, a triangulation 3-D laser scanner also emits coherent light in a grid-like pattern to scan the physical subject. However, rather than measure time-of flight, an offset camera is employed to look for the location where the coherent light strikes the subject (i.e. a laser dot). Depending on how far away the coherent light strikes the surface, the laser dot appears at different places in the camera's field of view, which can be used in a triangulation calculation to determine distance. In either case, a point cloud of geometric samples is produced by repeated application of the technique, where each point of the point cloud is associated with a particular x-axis, y-axis and z-axis position on the surface of the physical subject.

The points of the point cloud can be used to extrapolate the shape of the physical subject, which may be translated into a more readily used form through a reconstruction process. In reconstruction, the points of the point cloud are often used to produce a vector-based model, where the subject is represented by vector elements based on mathematical formulas, rather than by a large number of discrete points. For example, a first group of points that represent a surface may be converted to a first planar vector element. Likewise, a second group of points that represent another surface may be converted to a second planar vector element. In this manner, large numbers of discreet points may be reduced to a relatively small number of vector elements.

Unfortunately, reconstructing a vector-based model from a point cloud is typically a difficult process. Common reconstruction techniques include various automatic techniques and manual techniques.

In automatic techniques, a vector-based model is constructed by an automated process, where geometric primitives are automatically detected and converted into vector elements, for example by software. While seemingly appealing, such automatic techniques generally suffer from a number of shortcomings.

First, automatic techniques typically have no understanding of the geometry of the physical subject, and what points are significant or insignificant. The techniques generally rely upon a sensitivity parameter that indicates a threshold level of match between points and geometric primitives. Calibrating this sensitivity parameter may be extremely difficult, as it may vary among point clouds, depending on such things as the particular laser scanner employed to capture the point cloud, the particular physical subject scanned, distances between the scanner and subject, and the like. If it is set too thigh, a large number of very small geometric primitives may be detected, leading to a cluttered, confusing and potentially unusable vector-based model. For example, a particular physical feature (e.g., a door) may be represented by a large number of small geometric primitives. If a user desires to manipulate (e.g., move) the feature to test an alternative design, they would have to manipulate each an every one of the geometric primitives. This may be a daunting task. On the other hand, if the sensitivity parameter is set too low, a small number of very large geometric primitives may be detected, leading to a vector-based model that obscures or entirely omits important details. For example, a particular physical feature (e.g., a door) may be grouped together with other physical features (e.g., wall portions) and represented by a single geometric primitive. A user may be prevented from manipulating (e.g., moving) the feature to test an alternative design, absent times consuming manual operations to "separate" it from it from the other features.

Second, automatic techniques may be overly processing intensive, and therefore time consuming on typically computing hardware. Point clouds may include an extremely large number of discrete points, and it may require minutes or even hours to process an entire point cloud with an automatic technique on typical computing hardware. This delay may discourage the generation of vector-based models.

In manual techniques, a user is typically required to manually "draw" geometric primitives onto the point cloud, defining the extent of each geometric primitive. To "draw" geometric primitives, a user may manipulate a cursor to select a first specific point of the point cloud. The user may then move from this first point to one or more other specific points that are then selected. Collectively, the selected specific points define the exact bounds of the geometric primitive. However, such manual techniques generally suffer from a number of shortcomings.

First, it may be difficult for a user to accurately select specific points in a point cloud to "draw" the geometric primitive. When displayed on a typical display screen, e.g. a two-dimension (2-D) display screen, a point cloud typically appears completely flat. While each point in the point cloud may represent data at a different distance in 3-D space, when displayed on a 2-D display screen, a user may be unable to discern how far away from the viewing position a point is in 3-D space, without time-consuming additional operations. This may cause it to be difficult to accurately select specific points.

Second, manual approaches may be quite slow. The user may be burdened with precisely "drawing" each geometric primitive by selecting specific points that define their bounds. Given the effort and time required, it may discourage the generation of vector-based models.

Accordingly, there is a need for improved techniques for reconstructing a vector-based model from a point cloud that may address some, or all, of these shortcomings.

SUMMARY

In one embodiment, a semi-automated technique is used for reconstructing a vector-based model from a point cloud, which combines the intelligence of the user and the processing power of an electronic device. A user may use a user interface to select a number of points (referred to herein as a "seed of points") in the point cloud that correspond to a particular feature in a physical subject. The selection may be performed using a special flashlight tool provided in the user interface, which facilitates rapid selection of a seed of points from among the points of the point cloud. After selection of the seed of points, automatic detection may be employed to detect a geometric primitive based on the seed of points. The automatic detection may utilize a special iterative algorithm to detect the geometric primitive, which, in part, detects an initial geometric primitive based on the seed of points, uses the initial geometric primitive to determine an expanded set of points and detects a refined geometric primitive based on the expanded set of points. The automatic detection may return parameters of the refined geometric primitive, as well as an indication of points of the point cloud that are part of the geometric primitive. These points may be highlighted in the user interface. By repeating the selection of seeds of points, and automatic detection of geometric primitives, a vector-based model may be constructed from the point cloud.

BRIEF DESCRIPTION OF THE DRAWINGS

The detailed description below refers to the accompanying drawings of example embodiments, of which:

FIG. 8G is an illustration of example points that are part of the refined geometric primitive of FIG. 8F, the points selected based on a second threshold distance, $d_2$, from the refined geometric primitive;

DETAILED DESCRIPTION

Figure 1:
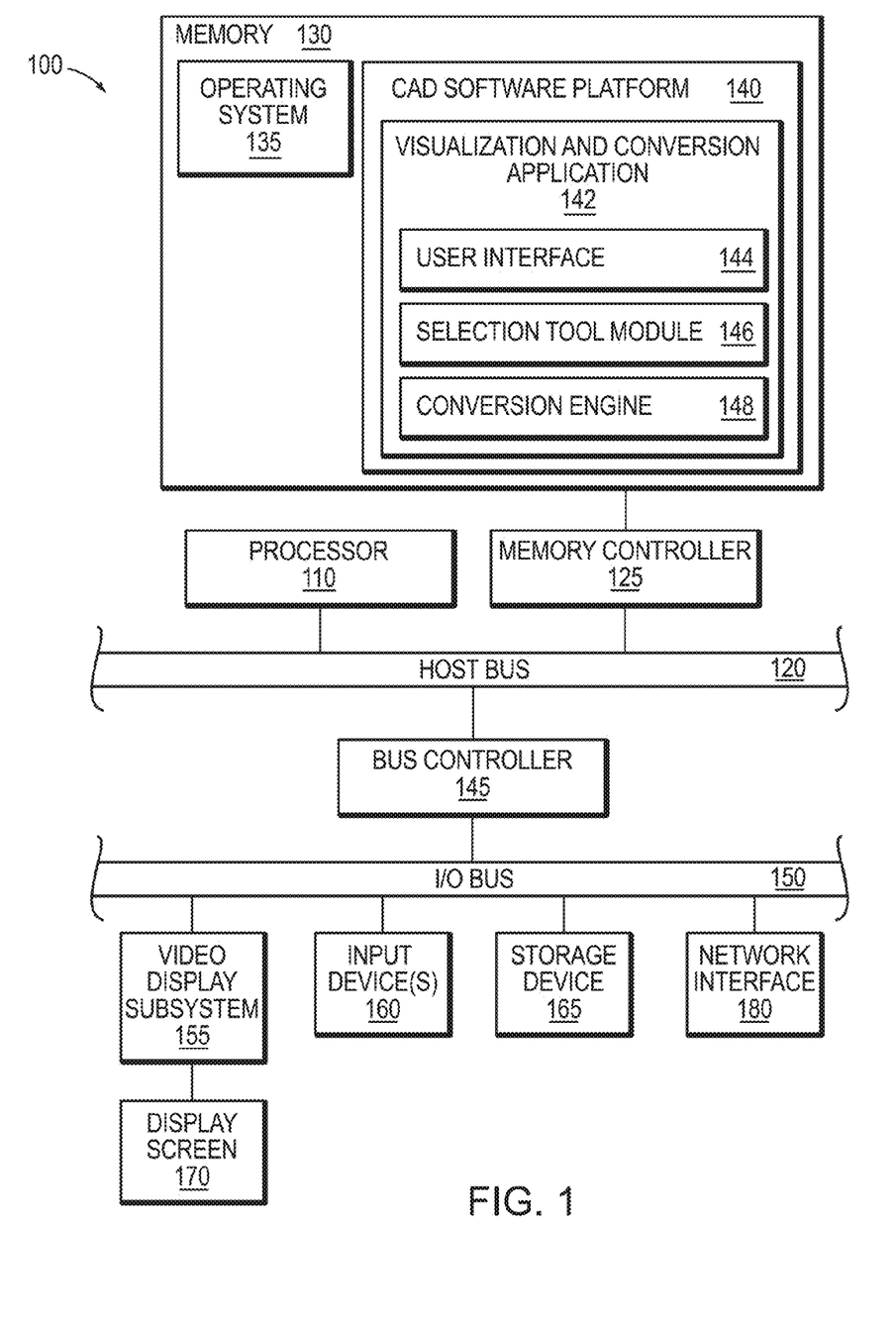
FIG. 1 is a block diagram of an example electronic device, (e.g., a computer), in which a semi-automated technique for reconstructing a vector-based model from a point cloud may be employed.

FIG. 1 is a block diagram of an example electronic device 100, (e.g., a computer), in which a semi-automated technique for reconstructing a vector-based model from a point cloud may be employed. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is configured to store at least a portion of computer-executable instructions and data for an operating system 135 while the electronic device 100 is operating. In addition, the memory 130 may store at least portions of a computer aided design (CAD) software platform 140 on which a wide variety of task-specific applications may be based. The CAD software platform 140 may provide base functionality relating to object management, geometric relationships, information and standards management, visualization, drawing and report extraction, and the like. In one embodiment, the CAD software platform is the MicroStation® V8i CAD software platform, available from Bentley Systems Inc. A number of task-specific applications, including a visualization and conversion application 142, may provide additional functionality leveraging the base functionality of the CAD software platform 140. In one embodiment, the visualization and conversion application 142 is the Bentley® Descartes visualization and conversion application, available from Bentley Systems Inc. Among other things, the visualization and conversion application 142 may include a user interface 144, a selection tool module 146, and a conversion engine 148, that collectively may be employed to implement a semi-automated technique for reconstructing a vector-based model from a point cloud, as discussed in more detail below.

The host bus 120 of the electronic device 100 is coupled to an input/output (I/O) bus 150 through a bus controller 145. A video display subsystem 155 may include a display screen 170, such as a 2-D display screen, and hardware to drive the display screen. The video display subsystem 155 is coupled to the I/O bus 150. The display screen 170, among other functions, may show a visual portion of the user interface of the visualization and conversion application 142. One or more input devices 160 are provided and used for interaction with the electronic device 100, and the visualization and conversion application 142 executing on the electronic device. The one or more input devices 160, may include 2-D input devices, such as a 2-D mouse. A persistent storage device 165, such as a hard disk drive, a solid-state drive, or other type or persistent data store, is coupled to the I/O bus 150, and may persistently store computer-executable instructions and data, that are available to be loaded to the volatile memory 130 when needed. For example, computer-executable instructions and data for the operating system 135, and the CAD software platform 140, and the visualization and conversion application 142, may be stored in the persistent storage device 165. The I/O bus 150 may further be coupled to a network interface 180 that interfaces with a computer network (not shown). The computer network may allow communication between the electronic device 100 and other devices, using any of a number of well known networking protocols, including wireless networking protocols, to permit a variety of distributed, collaborative or remote computing configurations.

A user may utilize the user interface 144 of the above mentioned visualization and conversion application 142 to view on the display screen 170 a point cloud. The point cloud may be composed of geometric samples descriptive of the shape of a physical subject, such as a discrete object, portions of a structure, terrain, or other parts of the physical environment. The geometric samples may be captured by a 3-D laser scanner or other scanning device.

A semi-automated technique for reconstructing a vector-based model from a point cloud may be employed that combines the intelligence of the user and the processing power of the electronic device 100. A user may use the user interface 144 of the visualization and conversion application 142 to select a number of points (referred to herein as "seed of points") in the point cloud that correspond to a particular feature in the physical subject. The selection may be aided by a special flashlight tool provided by that selection tool module 146, which facilitates rapid selection of a seed of points from among the points of the point cloud. After selection of a seed of points, the conversion engine 148 of the visualization and conversion application 142 may then be called upon to automatically detect a geometric primitive based on the seed of points. The conversion engine 148 may employ a special iterative algorithm to detect the geometric primitive, which, in part, detects an initial geometric primitive based on the seed of points, uses the initial geometric primitive to determine an expanded set of points, and detects a refined geometric primitive based on the expanded set of points. The conversion engine 148 may return parameters of the refined geometric primitive, as well as an indication of points of the point cloud that are part of the geometric primitive. These points may be highlighted in the user interface, and the user prompted to confirm that the detected geometric primitive meets expectations. By repeated selection of seeds of points, and automatic detection of geometric primitives, a vector-based model may be constructed from the point cloud of discrete points.

The seeds of points selected by a user need not be precisely selected. That is, every point in a seed of points need not be actually derived from the particular physical feature. The points of the seed of points may be considered to "correspond" to a particular physical feature provided that more points of the seed of points are derived from that particular physical feature than are derived from any other single physical feature of the subject. Further, the points of the seed of points need not define the exact bounds of the physical feature. They may simply represent points "on" the physical feature.

Further the automatic detection performed by the conversion engine 148 need not be over the entire point cloud. Only a subset of the overall point cloud may be considered by the conversion engine 148, such that the detection of the geometric primitive may occur quite rapidly. Further, a sensitivity parameter employed by the conversion engine 148 may be specific to the current automatic detection, such that the sensitivity parameters may differ on a feature-by-feature basis.

Figure 2:
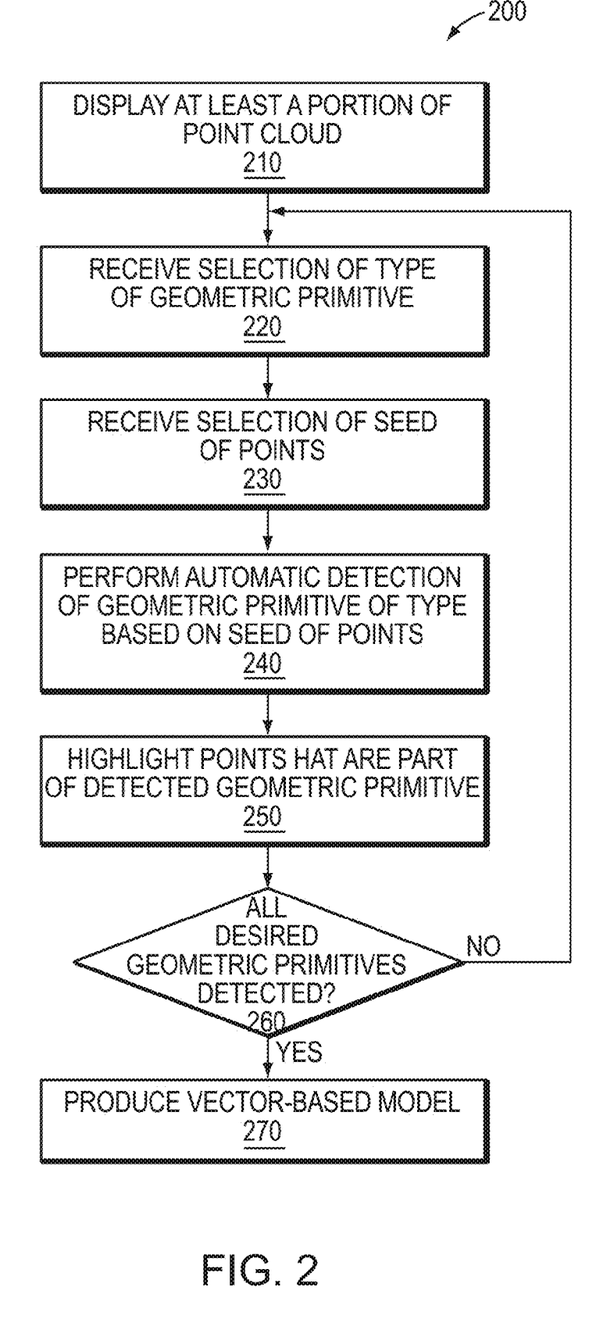
FIG. 2 is an example sequence of steps for a semi-automated technique for reconstructing a vector-based model from a point cloud.

FIG. 2 is an example sequence of steps for a semi-automated technique for reconstructing a vector-based model from a point cloud. At step 210, at least a portion of a point cloud that represents a physical subject is displayed on the display screen 170 by the user interface 144 of the visualization and conversion application 142. At optional step 220, a selection is received from the user of a type of geometric primitive that it to be detected. The selection may be received using one or more input devices 160. The type of geometric primitive may be a plane, a cylinder, a prism, a sphere, a pyramid, a torus, or other supported primitive.

At step 230, a selection is received from the user of a seed of points of the point cloud that correspond to a particular physical feature in the physical subject. As mentioned above, every point in the seed of points need not be actually derived from the particular physical feature, nor do they need to define the bounds of the physical feature. A "quick and careless" seed selection is generally sufficient. To permit such selection, the selection tool module 146 may provide a special flashlight virtual tool that facilitates rapid selection of a seed of points from among the points of the point cloud. Further details of an example flashlight virtual tool are provided below in connections with FIGS. 3-6.

At step 240, the conversion engine 148 performs an automatic detection of a geometric primitive selected in step 220, based on the seed of points from step 230. If a type was selected in optional step 220, the automatic detection will detect a geometric primitive of the selected type. Alternatively, the conversion engine 148 may determine a "best" type for the geometric primitive. The automatic detection may account for non-uniformity in the particular physical feature and noise in the seed of points, resulting from, for example, limited accuracy of the 3-D laser scanner or other scanning device. The conversion engine 148 may employ a special iterative algorithm to detect the geometric primitive that, in part, detects an initial geometric primitive based on the seed of points, uses the initial geometric primitive to determine an expanded set of points, and detects a refined geometric primitive based on the expanded set of points. Further details of an example iterative algorithm are provided below in connections with FIGS. 7-8. The conversion engine 148 may return parameters of the detected geometric primitive (e.g., an equation of the geometric primitive), as well as an indication of points of the point cloud that are part of the detected geometric primitive.

At step 250, the user interface 144 may highlight those points that are part of the detected geometric primitive, and the user may be prompted to confirm that the detected geometric primitive meets expectations.

At step 260, a determination is made whether all desired geometric primitives have been detected in the point cloud. If so, execution proceeds to step 270, were a vector-based model is produced from the geometric primitives, with vector elements corresponding to each detected geometric primitive. The vector based model may be stored in memory 130. If not, execution loops back to step 220, and the sequence of steps repeated for a different physical feature.

Figure 3:
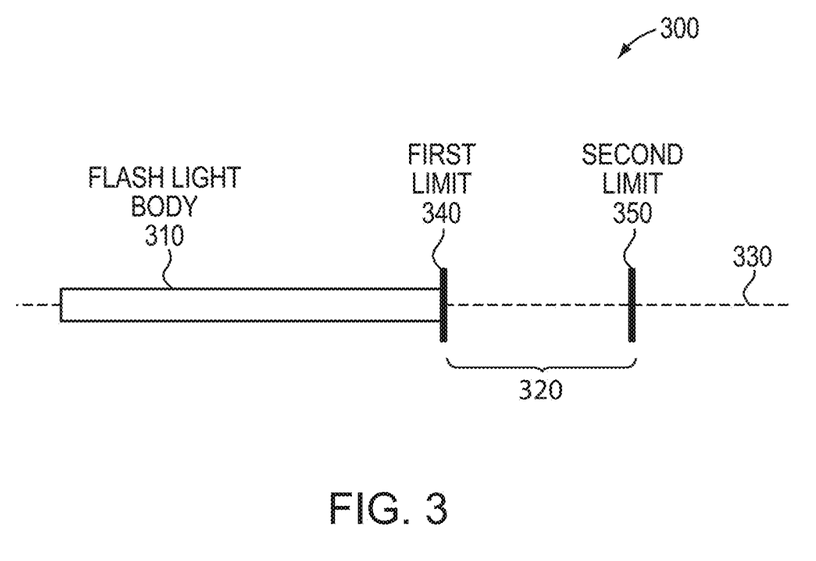
FIG. 3 is a schematic diagram of an example flashlight virtual tool that may be used.

As discussed above, the selection of the seed of points that correspond to a physical feature of the subject may be aided by a special flashlight virtual tool. FIG. 3 is a schematic diagram of an example flashlight virtual tool 300 that may be used. The flashlight virtual tool 300 has a position within the 3-D space of the point cloud. This position may be changed by a user using an input device 160. The flashlight virtual tool 300 includes a body 310. The body may be graphically displayed as a line or cylinder within the 3-D space of the point cloud. Alternatively, the body may be graphically displayed as an icon reminiscent of a physical flashlight. The flashlight virtual tool 300 also includes a field of view 320. The field of view 320 may be disposed along an axis 330 of the flashlight virtual tool 300, between a first limit 340 and a second limit 350. When the flashlight virtual tool 300 is positioned in 3-D space proximate to points of a point cloud, highlighting effects may be imposed upon points within the field of view 320, such that it appears that a stream of light is being emitted upon the points within the field of view. In one embodiment, the highlighting effects may change (e.g., a color may change) as points are selected or other actions are performed, to provide a visual indication to the user. Alternatively, the highlighting effects may remain constant.

Figure 4:
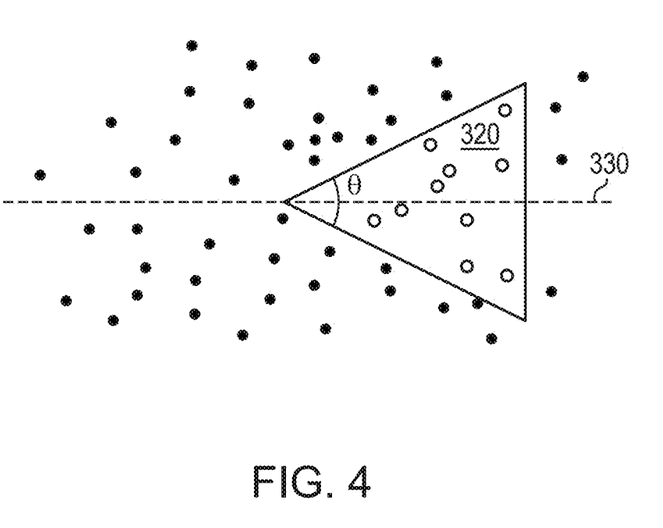
FIG. 4 is a schematic diagram of a cross section of an example field of view of the example flashlight virtual tool.

FIG. 4 is a schematic diagram of a cross section of an example field of view 320 of the example flashlight virtual tool 300. In this example, the field of view 320 is shaped as a cone. The cone may have its apex at the first limit 340 and its base at the second limit 350, with its axis aligned along the axis 330 of the flashlight virtual tool 300. The cone may be further defined by an opening angle θ. In other implementations, the field of view 320 may be shaped in a variety of different manners. For example, the field of view 320 may be shaped as a pyramid, a cylinder, a prism, multiple cones, multiple pyramids, or any of a variety of other shapes or combinations of shapes.

Points of the point cloud that fall within the field of view may be highlighted. In one embodiment, the highlighting effect may involve changing points within the field of view to a particular color, or tinting points within the field of view with a particular color. Different highlighting effects may involve changing or tinting points to different colors. As the user moves the flashlight virtual tool within the point cloud, the points of the point cloud that fall within the field of view change. As this occurs, the points of the point cloud that are highlighted may be updated in substantially real-time, to approximate the appearance of a real flashlight being moved while shining upon among real objects.

The selection tool module 146 may provide a selection button for the flashlight virtual tool 300. When activated, any points currently highlighted by the flashlight virtual tool 300 may be selected and added to a selection set maintained in memory. If the flashlight virtual tool 300 is moved within the user interface 144 while the selection button is still activated, such that additional points become highlighted, these additional points may be added to the selection set. Depending on the implementation, the selection button may take on any of a variety of different forms. For example, the selection button may be one or more physical buttons of an input device 160, such as a mouse button or keyboard key. Alternatively, the selection button may be one or more virtual buttons or other controls provided by the user interface 144, which may be displayed and selected on the display screen 170.

Figure 5:
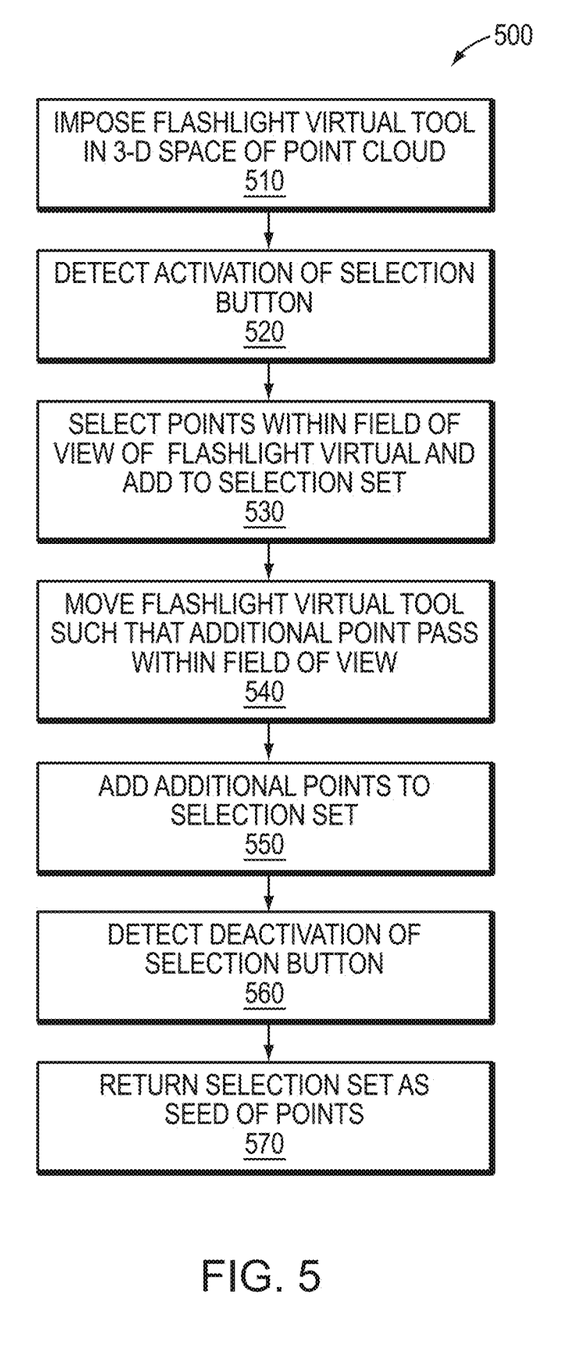
FIG. 5 is an example sequence of steps for using the example flashlight virtual tool to select a seed of points in a point cloud.

FIG. 5 is an example sequence of steps 500 for using the example flashlight virtual tool 300 to select a seed of points in a point cloud. At least some of the steps 500 of FIG. 5 may be implemented as part of step 230 of FIG. 2.

At step 510, the selection tool module 146 may impose the flashlight virtual tool 300 within the 3-D space of the point cloud, and show the flashlight virtual tool 300 on the display screen 170.

Figure 6A:
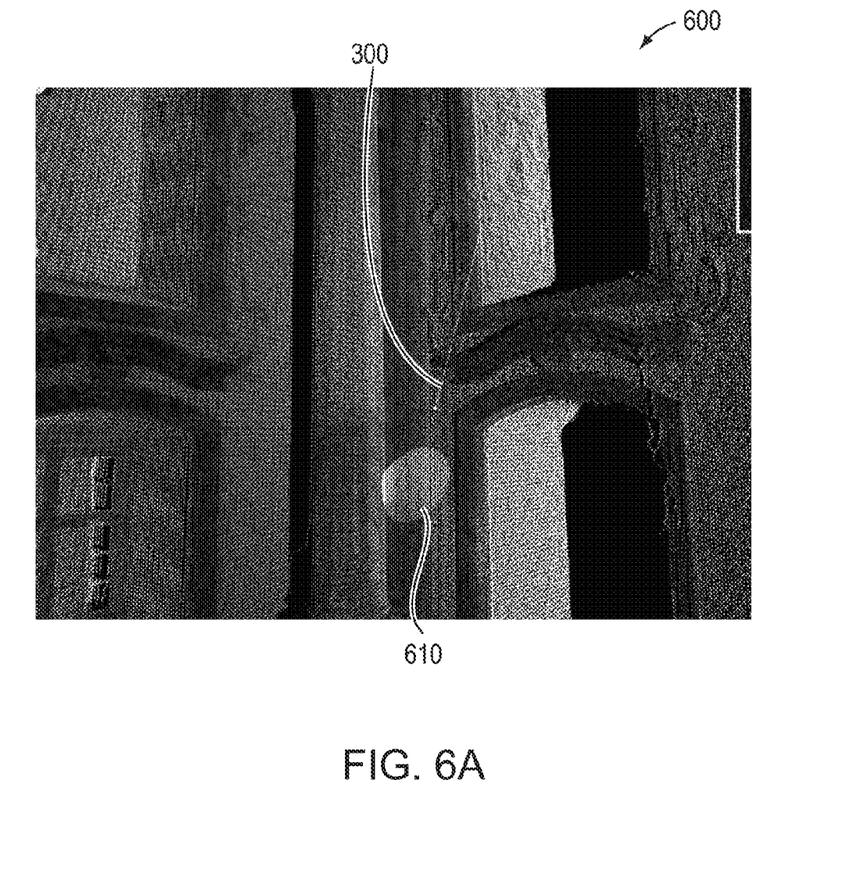
FIG. 6A is an example screen shot depicting the example flashlight virtual tool imposed within the 3-D space of an example point cloud.

FIG. 6A is an example screen shot 600 depicting the example flashlight virtual tool 300 imposed within the 3-D space of an example point cloud. In FIG. 6A, the example point cloud represents a portion of a structure, with columns, window openings, and other architectural features. However, it should be understood that the point cloud may represent any of a variety of other types of physical subjects. The points 610 that fall within the field of view of the flashlight virtual tool 300 may be highlighted with a first color, e.g. green. A user may move the flashlight virtual tool 300 about by manipulating an input device 160, such that different points fall within the field of view, and are highlighted with the first color.

At step 520, the selection tool module 146 detects that the user has activated the selection button for the flashlight virtual tool 300. At step 530, the selection tool module 146 selects points that currently fall within the field of view of the flashlight virtual tool 300, and adds these points to an initially-empty selection set stored in memory 130. The highlighting effect applied to the points may be changed to indicate their current selection.

Figure 6B:
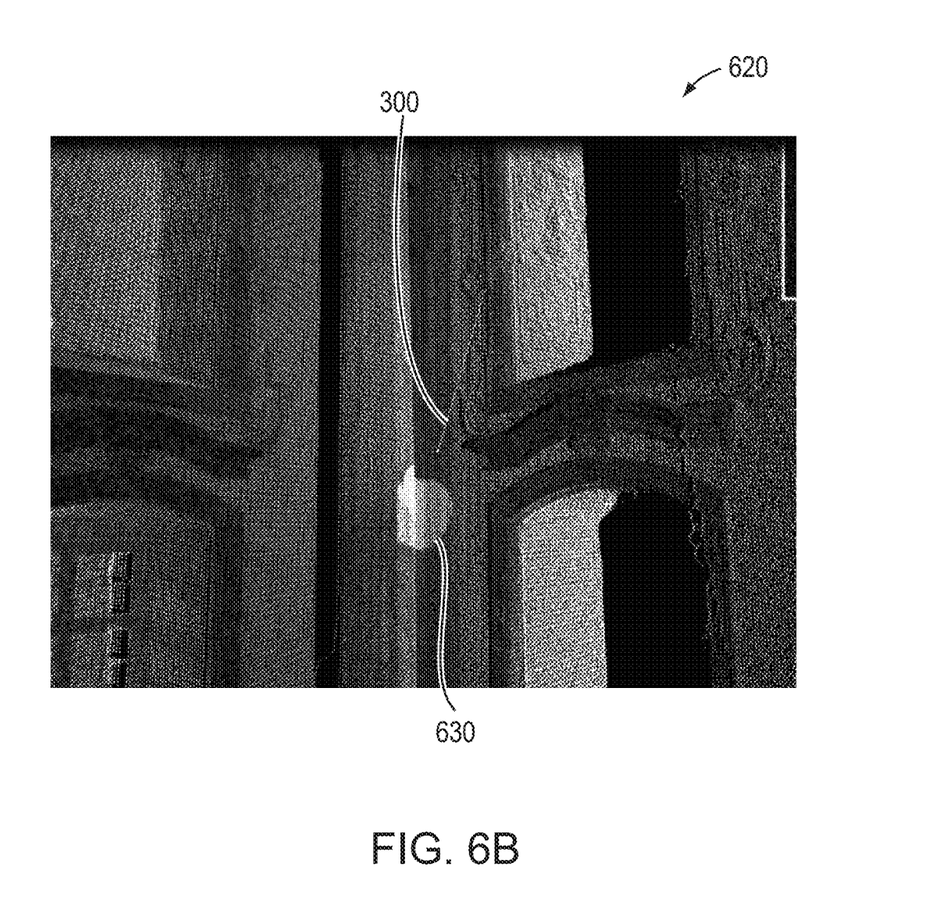
FIG. 6B is an example screen shot depicting points being selected by the example flashlight virtual tool, with their highlighting changed to indicate their current selection.

FIG. 6B is an example screen shot 620 depicting points 630 being selected by the example flashlight virtual tool 300, with their highlighting changed to indicate their current selection. The highlighting may be of a second color, e.g., light blue, different from the first color.

Figure 6C:
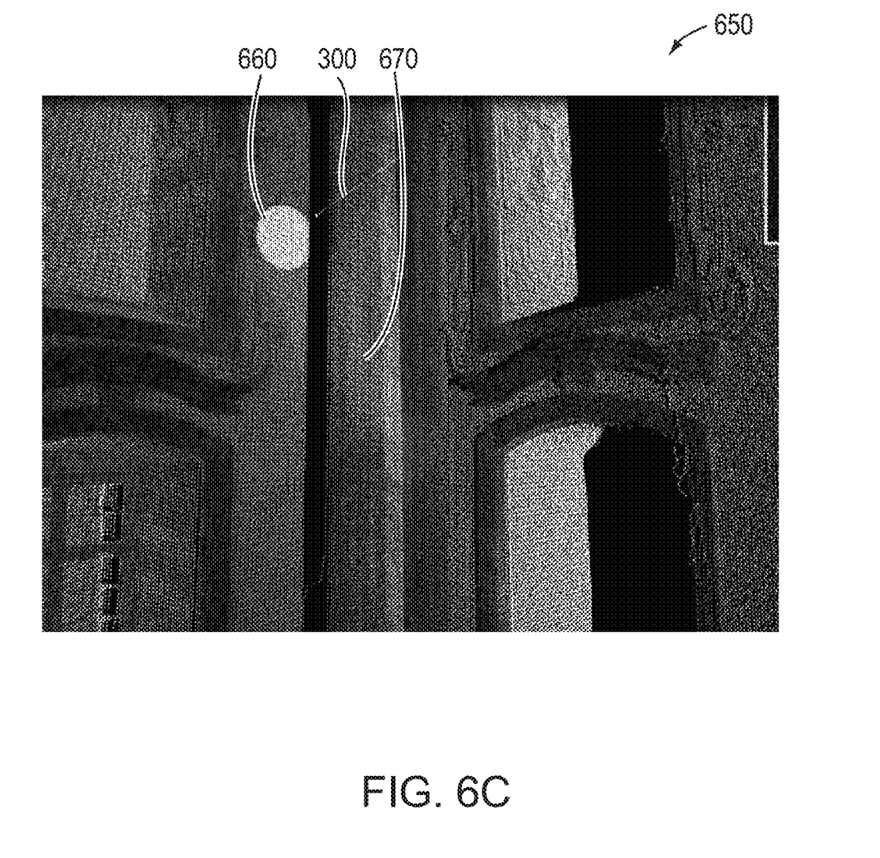
FIG. 6C is an example screen shot depicting additional points being selected by the example flashlight virtual tool.
Figure 6D:
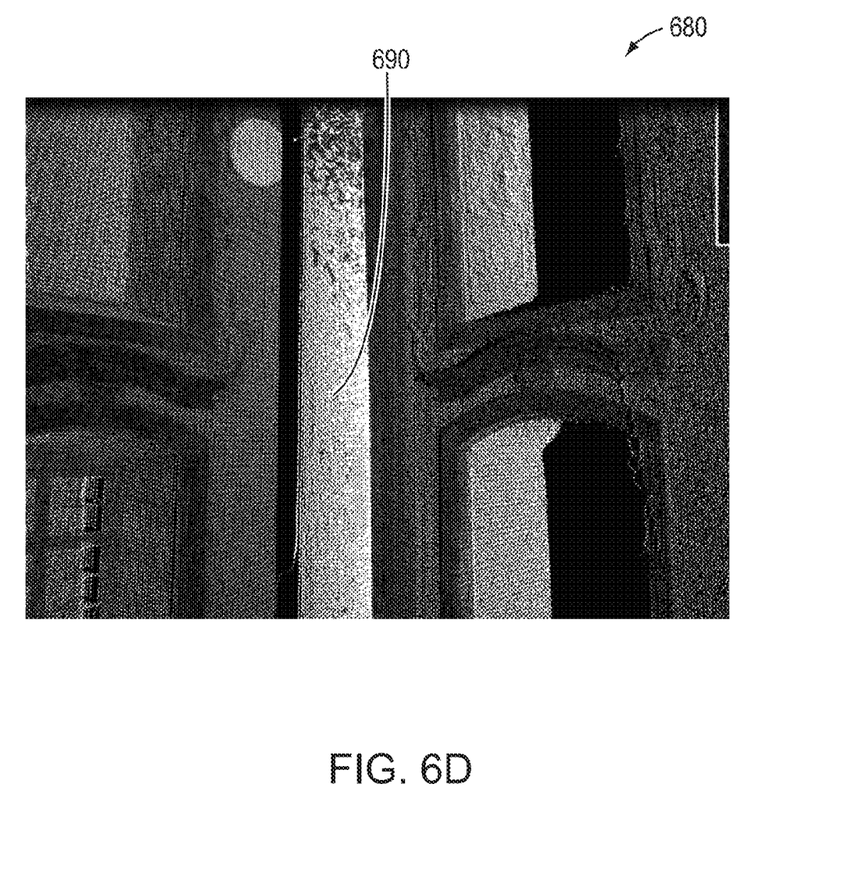
FIG. 6D is an example screen shot showing points associated with a returned geometric primitive highlighted.

At step 540, while the selection button is still activated, the flashlight virtual tool 300 may be moved within the 3-D space of the point cloud, such that additional points pass within the field of view, and previously selected points fall out of the field of view. At step 550 the additional points may be added to the selection set stored in memory. The additional points may have their highlighting changed to indicate their current selection. For example, their highlighting may be changed to the second color, e.g., light blue. Further, the previously selected points may have their highlighting changed to indicate their previous selection. For example, their highlighting may be changed to a third color, e.g., dark blue. The highlighting may provide visual feedback to the user, allowing him or her to readily discern what has been selected so far. This may, for example, allow the user to determine if an adequate number of points have been selected for the particular feature that is to be modeled. FIG. 6C is an example screen shot 650 depicting additional points being selected by the example flashlight virtual tool 300. Points 660 currently within the field of view of the flashlight virtual tool 300, and the subject of current selection, are highlighted in the second color, e.g., light blue. Points 670 subject to pervious selection are shown highlighted in the third color, e.g., dark blue.

At step 560, the selection tool module 146 detects that the user has deactivated the selection button for the flashlight virtual tool 300. At step 570, in response to the deactivation, the points of the selection set are returned as a seed of points.

Figure 7:
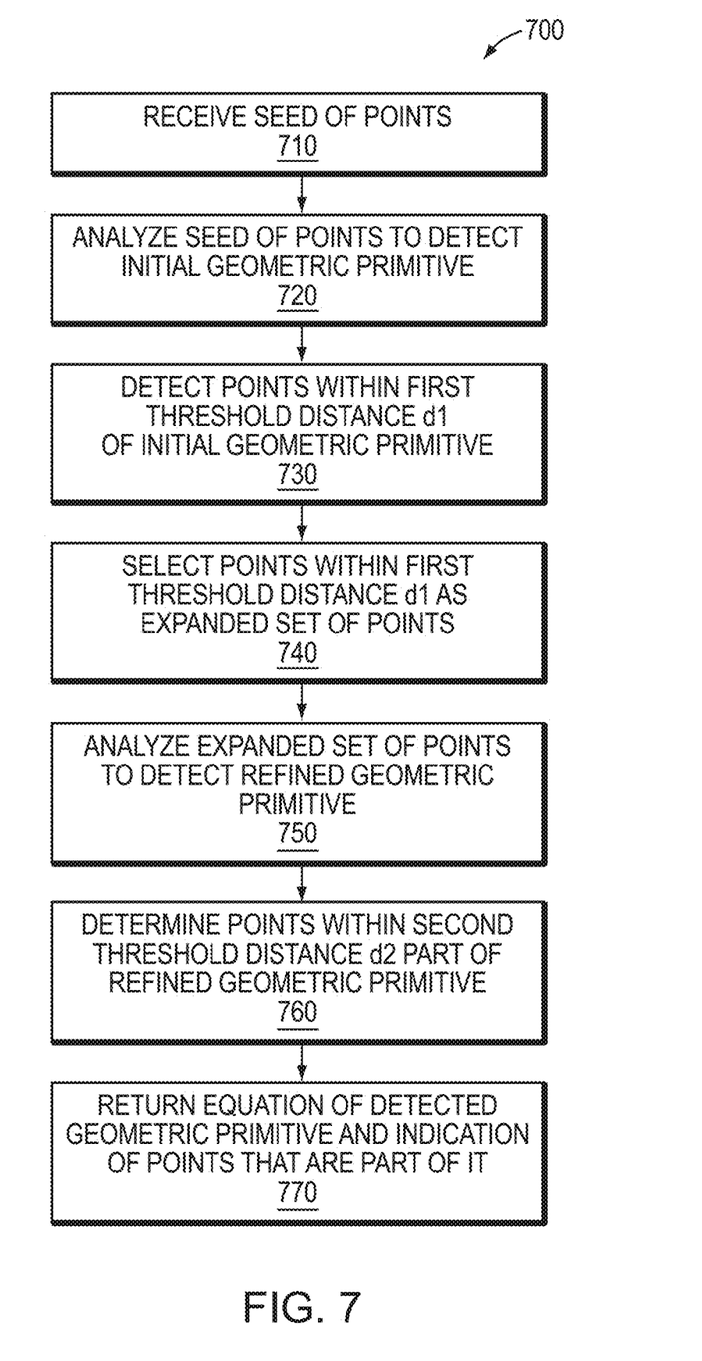
FIG. 7 is an example sequence of steps for performing automatic detection of a geometric primitive using an example iterative algorithm.

As discussed above, the seed of points may be used by the conversion engine 148 to perform an automatic detection of a geometric primitive. FIG. 7 is an example sequence of steps 700 for performing automatic detection of a geometric primitive using an example iterative algorithm. At least some of the steps 700 of FIG. 7 may be implemented as part of step 240 of FIG. 2.

At step 710, the seed of points is received by the conversion engine 148 from the selection tool module 146. As discussed above, the seed of points, in general, corresponds to a physical feature of the physical subject, however typically not every point is actually derived from the particular physical feature, and there is generally noise among the points resulting from non-uniformity in the particular physical feature and limited accuracy of the scanning device.

Figure 8A:
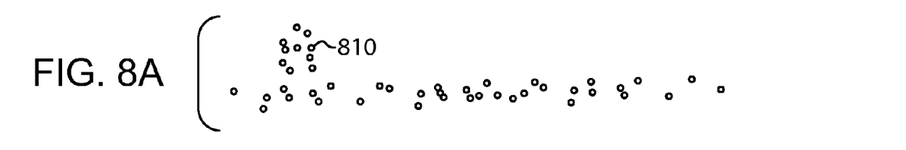
FIG. 8A is an illustration of a portion of an example point cloud associated with a physical feature.

FIG. 8A is an illustration of a portion of an example point cloud associated with a physical feature. In this example, the portion is a flat surface. For purposes of illustration, the portion is abstracted to be a 2-D representation. However, it should be understood that the techniques are applicable, among other uses, to point clouds that inhabit 3-D space and represent 3-D physical subjects. A projection of points 810 may extend from the flat surface due to non-uniformity in the flat surface. Further, the points may be generally dispersed as a result of noise introduced by the scanning process.

Figure 8B:
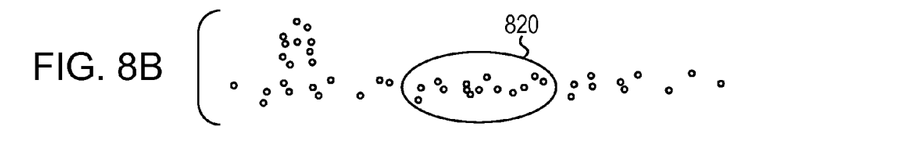
FIG. 8B is an illustration of an example seed of points for the physical feature of FIG. 8A.

FIG. 8B is an illustration of an example seed of points 820 for the physical feature of FIG. 8A.

At step 720, the conversion engine 148 analyzes the seed of points to detect an initial geometric primitive that best matches the seed. If the user selected a type of geometric primitive in optional step 220 of FIG. 2, the initial geometric primitive may be of the selected type. Alternatively, the initial geometric primitive may be of a type deters mined to be "best" by the conversion engine 148. The initial geometric primitive represents the particular physical feature that corresponds to the seed of points. The conversion engine 148 may employ a library to perform the actual analysis and detection of the initial geometric primitive. In one implementation, the library may be the Point Cloud Library (PCL) image and point cloud processing library, available as an open source library. The PCL image and point cloud processing library employs a random sample consensus (RANSAC) algorithm that involves selecting a sample set, computing a model, computing and counting inliers, and repeating these operations until a sufficient level of confidence of fit is achieved in a geometric primitive. In other implementations, rather than use the PCL image and point cloud processing library, a variety of other libraries may be employed. In still other alternative implementation, no library may be employed, and the analysis and detection may be performed by code internal to the conversion engine 148.

Figure 8C:
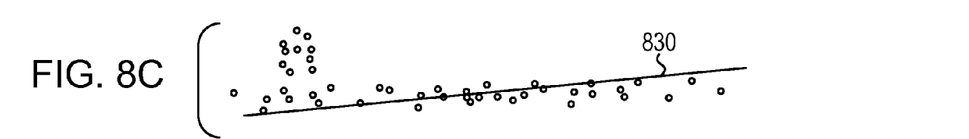
FIG. 8C is an illustration of an example initial geometric primitive that is detected as a best match for the example seed of points of FIG. 8B.

FIG. 8C is an illustration of an example initial geometric primitive 830 that is detected as a best match for the seed of points 820 of FIG. 8B. In this example, the initial geometric primitive is an initial plane. The initial plane may closely match the points of the seed of points 820, but may poorly match for the overall physical feature of the physical subject.

At step 730, the conversion engine 148 detects points in the point cloud that are within a first threshold distance, $d_1$, of the initial geometric primitive 830. The first threshold distance, $d_1$, may be selected such that points which deviate due to noise are substantially included within the first threshold distance, $d_1$, yet points which deviate due to non-uniformity in the physical feature are substantially excluded. The selection of $d_1$ may be made by the user, or by an automated process.

Figure 8D:
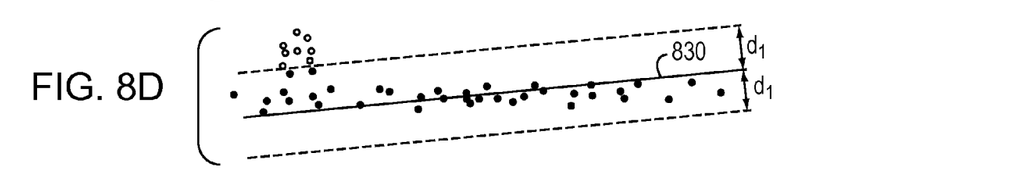
FIG. 8D is an illustration of a first threshold distance, $d_1$, measured from the example initial geometric primitive of FIG. 8C.

FIG. 8D is an illustration of a first threshold distance, $d_1$, measured from the example initial geometric primitive 830 of FIG. 8C. As can be seen, despite noise, substantially all the points of the physical feature fall within the first threshold distance, $d_1$, of the initial plane with the exception of the projection of points 810 resulting from non-uniformity in the surface.

At step 740, the conversion engine 148 selects the points that fall within the first threshold distance, $d_1$, as an expanded set of points.

Figure 8E:
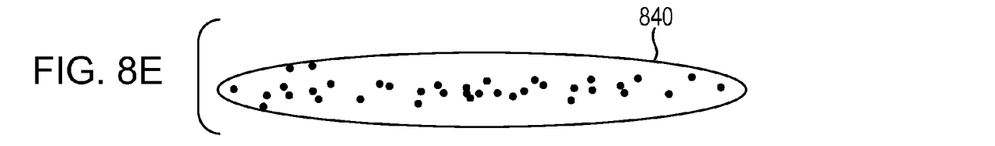
FIG. 8E is an illustration of an expanded set of points derived from the initial geometric primitive based on the first threshold distance, $d_1$, shown in FIG. 8D.

FIG. 8E is an illustration of an expanded set of points 840 derived from the initial geometric primitive 830 based on the first threshold distance, $d_1$, from FIG. 8D.

At step 750, the conversion engine 148 analyzes the expanded set of points to detect a refined geometric primitive that best matches the expanded set of points. Again, the conversion engine 148 may employ an external library to perform the actual analysis and detection, for example, the PCL image and point cloud processing library may be called.

Figure 8F:
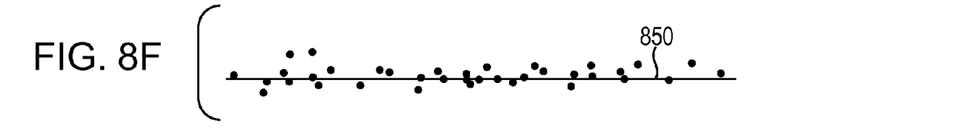
FIG. 8F is an illustration of an example refined geometric primitive that is detected as a best match for the expanded set of points from FIG. 8E.

FIG. 8F is an illustration of a refined geometric primitive 850 that is detected as a best match for the expanded set of points from FIG. 8E. Here, the refined geometric primitive 850 is a refined plane. The refined plane may provide a much better match to the overall physical feature than the initial plane.

At step 760, the conversion engine 148 may determine points of the point cloud that are part of the refined geometric primitive 850. Specifically, points of the point cloud that are within a second threshold distance, $d_2$, of the refined geometric primitive may be considered to be part of the refined geometric primitive 850. The second threshold distance, $d_2$, may be selected to be less than the second threshold distance, $d_1$, to exclude points unlikely to be a part of the physical feature. The value of $d_2$ may be specified by the user or determined automatically by the conversion engine 148.

FIG. 8G is an illustration of example points that are part of the refined geometric primitive 850 of FIG. 8F, the points selected based on a second threshold distance, $d_2$, from the refined geometric primitive 850. As can be seen, at least some points from the projection 810 included in the expanded set of points 840, do not fall within the second threshold distance, $d_2$, and are therefore excluded from the points considered to be part of the refined geometric primitive.

At step 770, the refined geometric primitive is used as the detected geometric primitive, and the conversion engine 148 returns an equation of there detected geometric primitive and an indication of the points that are part of the detected geometric primitive.

As discussed above, provided that the detected geometric primitive meets the user's expectations, the returned equation may be used for a vector element of a vector-based model. To determine if the detected geometric primitive meets the user's expectations, the returned indication of points may be used to highlight points associated with the geometric primitive in the displayed point cloud.

Referring back to the example shown in FIGS. 6A-6C, FIG. 6D is an example screen shot 680 showing points 690 associated with a returned geometric primitive highlighted. The points 690 may be highlighted in a manner different than the other highlighting, for example, by changing their color to fourth color, e.g., yellow. From the highlighting, the user may rapidly determine if the detected geometric primitive is consistent with their expectations.

While the above description discusses various embodiments of the present disclosure, it should be apparent that a number of modifications and/or additions may be made without departing from the disclosure's intended spirit and scope. It should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method for reconstructing a vector-based model from a point cloud that represents a physical subject comprising:

displaying at least a portion of the point cloud that represents the physical subject on a display screen of an electronic device, each point of the point cloud associated with a position in three-dimensional (3-D) space;

receiving a selection of a seed of points in the point cloud that correspond to a particular physical feature of the physical subject, the selection received with a flashlight virtual tool having a field of view, points of the point cloud falling within the field of view being used as the seed of points;

performing an automatic detection of a geometric primitive based on the seed of points, using an iterative algorithm that detects an initial geometric primitive based on the seed of points, uses the initial geometric primitive to determine an expanded set of points that include points outside of the seed of points, and detects a refined geometric primitive based on the expanded set of points, wherein the refined geometric primitive is returned as the detected geometric primitive; and producing a vector-based model using the detected geometric primitive.

2. The method of claim 1, further comprising:

highlighting points of the point cloud that are a part of the detected geometric primitive in the portion of the point cloud that is being displayed on the display screen of the electronic device.

3. The method of claim 1, further comprising:

receiving a selection, by an input device of the electronic device, of a type of geometric primitive to be detected, and wherein the performing performs an automatic detection of a geometric primitive of the type.

4. The method of claim 1 further comprising:

determining additional geometric primitives are to be detected; and repeating the receiving and performing until all desired geometric primitives have been detected.

5. The method of claim 1, wherein the receiving further comprises:

imposing the flashlight virtual tool within the 3-D space of the point cloud;

detecting activation of a selection button for the flashlight virtual tool;

adding points that fall within the field of view to a selection set; and returning the points of the selection set as the seed of points.

6. The method of claim 5, further comprising:

detecting the flashlight virtual tool being moved, while the selection button is still activated; and adding additional points that pass within the field of view, while the selection button is still activated, to the selection set.

7. The method of claim 5 further comprising:

prior to detecting activation of the selection button, highlighting points falling within the field of view with a first color; and after activation of the selection button, highlighting points falling within the field of view with a second color different than the first color.

8. The method of claim 7, further comprising:

highlighting points that are the subject of previous selection with a third color, different than the first and second colors.

9. The method of claim 1, wherein the performing detects the initial geometric primitive and detects the refined geometric primitive by calling a library that employs a random sample consensus (RANSAC) algorithm.

10. The method of claim 1, wherein the performing uses the initial geometric primitive to determine the expanded set of points by:

detecting points in the point cloud that are within a first threshold distance of the initial geometric primitive; and selecting points that fall within the first threshold distance as the expanded set of points.

11. The method of claim 1, wherein the performing further comprises:

detecting points in the point cloud that are within a second threshold distance of the refined geometric primitive; and returning points that fall within the second threshold distance as points that are part of the detected geometric primitive.

12. An apparatus for reconstructing a vector-based model from a point cloud that represents a physical subject, comprising:

a display screen;

a processor; and a memory coupled to the processor and configured to store instructions for a visualization and conversion application that are executable by the processor, the instructions for the visualization and conversion application including instructions for:

a user interface configured to display at least a portion of the point cloud that represents the physical subject, each point of the point cloud associated with a position in three-dimensional (3-D) space, a selection tool module configured to receive a selection of a seed of points in the point cloud that correspond to a particular physical feature of the physical subject, and a conversion engine configured to perform an automatic detection of a geometric primitive based on the seed of points, using an iterative algorithm that detects an initial geometric primitive based on the seed of points, uses the initial geometric primitive to determine an expanded set of points that include points outside of the seed of points, and detects a refined geometric primitive based on the expanded set of points, wherein the conversion engine is further configured to produce a vector-based model using the detected geometric primitive.

13. The apparatus of claim 12, wherein the conversion engine is configured to detect the initial geometric primitive and detect the refined geometric primitive by calls to a library that employs a random sample consensus (RANSAC) algorithm.

14. The apparatus of claim 12, wherein the conversion engine is configured to use the initial geometric primitive to determine an expanded set of points by detection of points in the point cloud that are within a first threshold distance of the initial geometric primitive, and selection of points that fall within the first threshold distance as the expanded set of points.

15. The apparatus of claim 12, wherein the conversion engine is configured to determine points of the point cloud that are part of the refined geometric primitive as points that are within a second threshold distance of the refined geometric primitive.

16. A method for reconstructing a model from a point cloud that represents a physical subject, comprising:

displaying at least a portion of the point cloud that represents the physical subject on a display screen of an electronic device, each point of the point cloud associated with a position in three-dimensional (3-D) space;

receiving a selection from a user of a seed of points in the point cloud that correspond to a particular physical feature of the physical subject;

performing an automatic detection of a geometric primitive based on the seed of points, using an iterative algorithm that detects an initial geometric primitive based on the seed of points, uses the initial geometric primitive to determine an expanded set of points that include points outside of the seed of points, and detects a refined geometric primitive based on the expanded set of points, wherein the refined geometric primitive is returned as the detected geometric primitive; and producing a model using the detected geometric primitive.

17. The method of claim 16, wherein the receiving is performed based on a selection tool having a field of view, wherein points of the point cloud falling within the field of view are used as the seed of points.

18. The method of claim 17, wherein the selection tool is a flashlight virtual tool.

19. The method of claim 18, wherein the receiving further comprises:
    imposing the flashlight virtual tool within the 3-D space of the point cloud;
    detecting activation of a selection button for the flashlight virtual tool;
    adding points that fall within the field of view to a selection set; and
    returning the points of the selection set as the seed of points.

20. The method of claim 19, further comprising:
    detecting the flashlight virtual tool being moved, while the selection button is still activated; and
    adding additional points that pass within the field of view, while the selection button is still activated, to the selection set.

21. The method of claim 16, wherein the performing uses the initial geometric primitive to determine the expanded set of points by:
    detecting points in the point cloud that are within a first threshold distance of the initial geometric primitive; and
    selecting points that fall within the first threshold distance as the expanded set of points.

22. The method of claim 21, wherein the performing further comprises:
    detecting points in the point cloud that are within a second threshold distance of the refined geometric primitive; and
    returning points that fall within the second threshold distance as points that are part of the detected geometric primitive.

* * * * *

UNITED STATES PATENT AND TRADEMARK OFFICE
CERTIFICATE OF CORRECTION

Page 1 of 1

PATENT NO.         : 9,189,888 B1
APPLICATION NO.    : 13/740761
DATED              : November 17, 2015
INVENTOR(S)        : Côté

It is certified that error appears in the above-identified patent and that said Letters Patent is hereby corrected as shown below:

In the Specification:
Col. 2, line 22 should read:
design, absent time-consuming manual operations to "sepa- Col. 9, line 2 should read:
geometric primitive may be of a type determined to be Signed and Sealed this
Twenty-sixth Day of April, 2016

Michelle K. Lee
*Director of the United States Patent and Trademark Office*